E. MELNICHUK.
TRANSMISSION FOR BICYCLES.
APPLICATION FILED SEPT. 25, 1919.
1,334,108.
Patented Mar. 16, 1920.
2 SHEETS—SHEET 1.
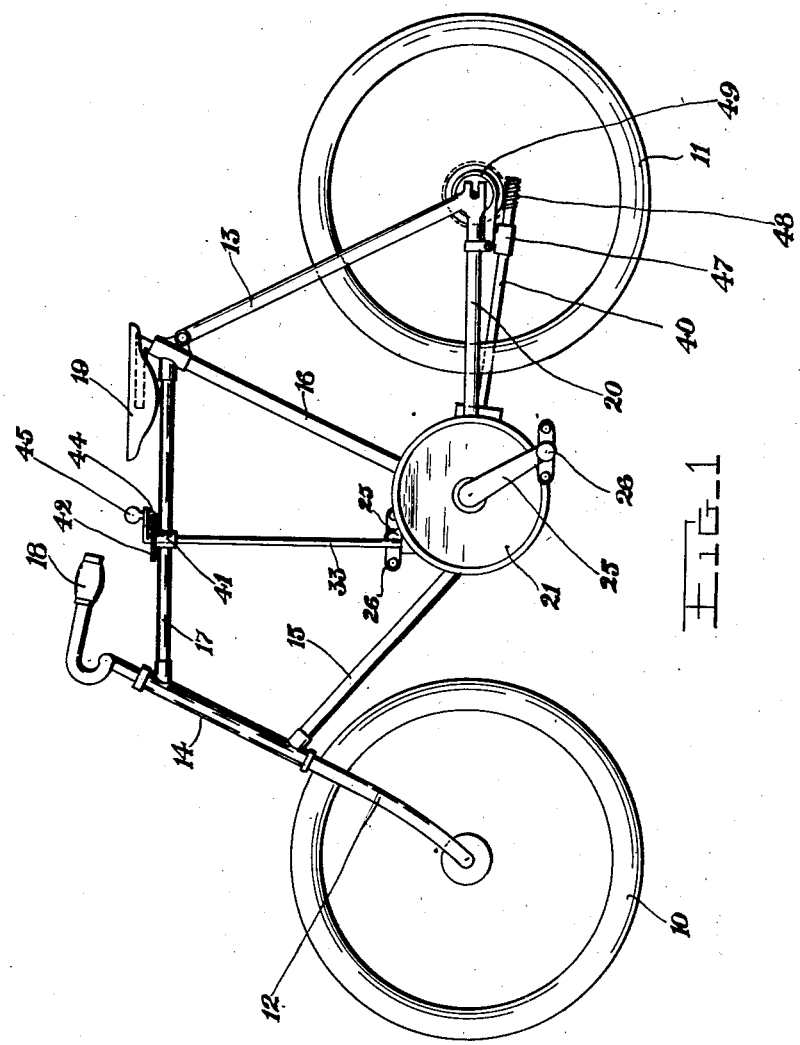
INVENTOR.
EFREM MELNICHUK
BY
ATTORNEY.

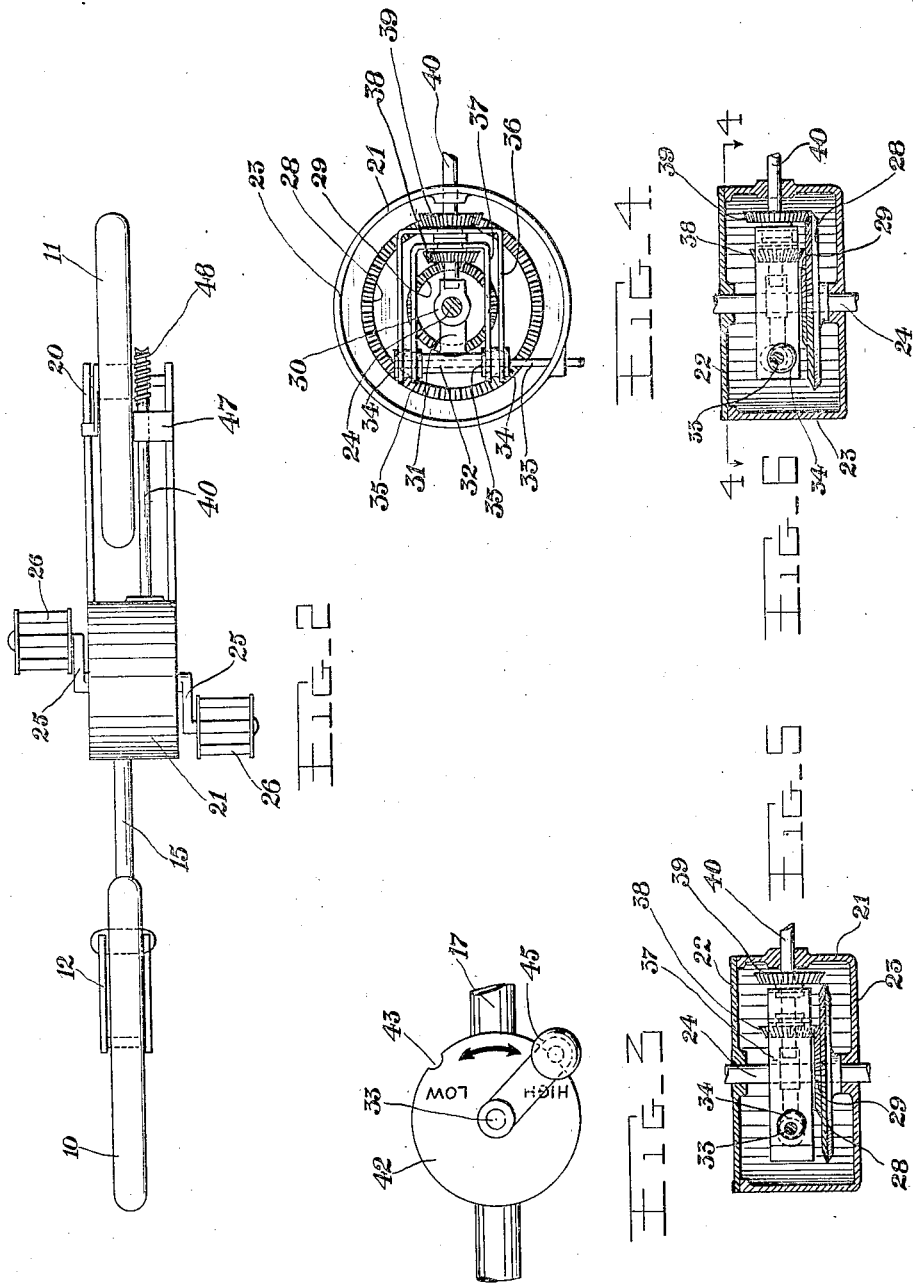

UNITED STATES PATENT OFFICE.

EFREM MELNICHUK, OF CHESTER, CONNECTICUT.

TRANSMISSION FOR BICYCLES.

1,334,108.  Specification of Letters Patent.  Patented Mar. 16, 1920.

Application filed September 25, 1919. Serial No. 326,229.

*To all whom it may concern:*

Be it known that I, EFREM MELNICHUK, a citizen of Russia, residing at Chester, county of Middlesex, and State of Connecticut, have invented certain new and useful Improvements in Transmissions for Bicycles, of which the following is a specification.

This invention has as its principal object, the provision of means whereby the speed of a bicycle or like vehicle may be accelerated or retarded by the operator in a convenient manner.

A further object is to provide the pedal mechanism with change gears directly connected with the actuating mechanism of the vehicle thereby avoiding chains, belts and like forms of drivers and presenting a neat appearing structure.

These and other like objects are attained by the novel construction and combination of parts, hereinafter described and shown in the accompanying drawings, forming a material part of this disclosure, and in which—

Figure 1 is a side elevational view showing a bicycle made in accordance with the invention.

Fig. 2 is a bottom plan view of the same.

Fig. 3 is an enlarged fragmentary top plan view showing the shifting device.

Fig. 4 is a transverse sectional view taken on line 4—4 of Fig. 6.

Fig. 5 is a horizontal sectional view through the center of the gear casing, and, Fig. 6 is a similar view of the casing showing the parts in another position.

Referring to the drawings in detail, the numeral 10 indicates the front wheel of the vehicle and 11 the rear, the front wheel being engaged by the front forks 12 and the rear wheel by the corresponding rear forks 13, these being a part of a standard or conventional type of bicycle frame comprised of the front fork sleeve 14, and front and rear strut elements 15 and 16, connected at their upper ends with the horizontal bar 17, above which extends a steering handle 18 and a seat 19 convenient for the operator.

A pair of horizontal bars 20 are engaged at their front ends with a cylindrical casing 21 having a removable cover 22 as indicated in Fig. 1. The rear wall 23 of the casing, together with the cover has inwardly extending hubs in which are rotatably mounted a spindle 24 having attached at its extending ends cranks 25, their outer ends having pivoted upon them pedals 26 of the usual type of construction and operated in a well known manner.

Attached to the spindle 24 close to the inner hub extending from the casing 23, is a relatively large bevel gear 28 having affixed to its face a similar but smaller gear 29. Rotatably mounted upon the spindle 24 is the hub 30 of an arm 31 integrally formed with the transverse sleeve 32 in which is rotatably mounted a spindle 33, carrying near the ends of the sleeve, pairs of eccentrics 34 and 35, these eccentrics being mounted in the parallel elements of the yoke loops 36 and 37, respectively inner and outer, in which, in turn, are engaged at their outer ends with the hubs of other bevel gears 38 and 39.

These gears are slidably mounted on a spindle 40 which extends outward from the casing 21, passing through a bearing 47 and is provided at the outer end with a worm 48 engaged with the teeth of the worm gear 49 fixed on the rear or driving shaft of the vehicle.

The spindle 33 passes through a guide 41, connected to the horizontal bar 17 and on which is mounted a stationary disk 42 containing recesses 43 engageable with a plunger detent 44, actuated by the crank handle 45, so that the same may be shifted from one side to the other, into either of the recesses 43, thereby partially rotating the vertical spindle 33 and the gears 38 or 39 into engagement with the gears 28 or 29 as may be required.

In operation, the parts having been assembled as indicated, upon actuating the pedals 26, rotary motion is conducted through the cranks 25 to the gears 28 and 29 which are engageable with either of the gears 38 and 39 according to the position of the handle 45. As shown in Fig. 3 the gears 29 and 38 are in engagement, giving a relatively slow speed to the shaft 40, while in Fig. 6, the gears 28 and 39 are in engagement, causing a more rapid rotation of the shaft 40, by the same number of revolutions of the pedal spindle 24, in a manner which will be readily understood.

From the foregoing it will be apparent that in climbing hills, passing through sand or other hard going, the low speed gears may be placed in position by actuating the handle 45 from the riding seat and conversely, a higher speed is attained by shifting the handle 45 in an opposite direction.

Having thus described my invention and set forth the manner of construction and use, what I claim as new and desire to secure by Letters Patent, is—

In a transmission device for bicycles, the combination with a frame having a steering and a driving wheel, said driving wheel being adapted for worm operation, of a gear casing carried by said frame between said wheels, a crank axle journaled in said casing, said axle having pedals at the ends thereof, a relatively large bevel gear fixed upon said axle in said casing, a smaller bevel gear secured upon the face of the larger gear, a worm shaft extending substantially horizontal from said casing adapted to actuate said drive wheel, a pair of gears secured in tandem upon said worm shaft within said casing, one of said bevel gears being engageable with the smaller of the first named bevel gears and the other with the larger of said bevel gears, yokes engaging the hubs of the last named bevel gears whereby they may be moved longitudinally on said worm shaft, eccentrics for actuating said yokes, a spindle upon which said eccentrics are mounted, said spindle extending upward to the upper element of said frame, a crank fixed upon said spindle, and means for holding said crank in either of two positions whereby either of said sliding bevel gears may be meshed with said driving gears.

In testimony whereof I have affixed my signature.

EFREM MELNICHUK.